No. 677,555. Patented July 2, 1901.
D. B. BAKER.
WOOD SPLIT PULLEY.
(Application filed Dec. 1, 1900.)
(No Model.)
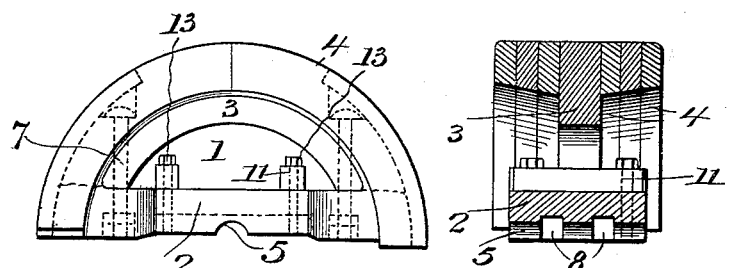
Fig. 1. Fig. 2.
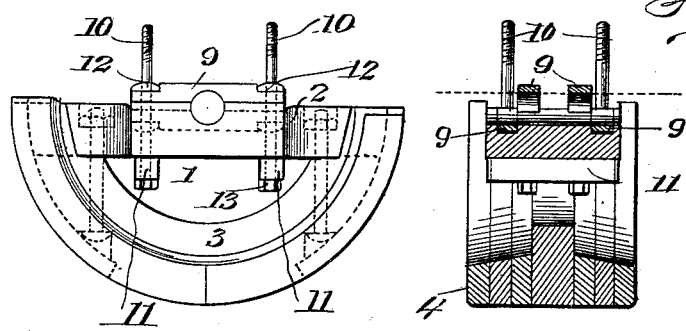
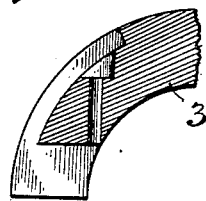
Fig. 4. Fig. 5.
Fig. 3.
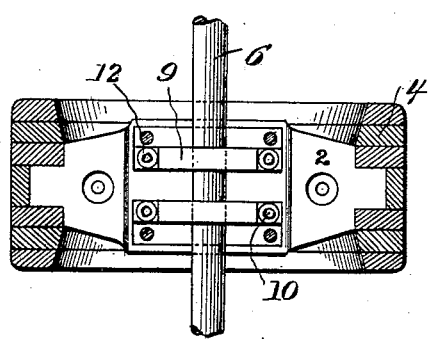
Witnesses
Fenton St Belt.
Elmer Seavey.
Inventor
David B. Baker,
By Mason Fenwick & Lawrence.
Attorneys

UNITED STATES PATENT OFFICE.

DAVID B. BAKER, OF TACOMA, WASHINGTON.

WOOD SPLIT PULLEY.

SPECIFICATION forming part of Letters Patent No. 677,555, dated July 2, 1901.

Application filed December 1, 1900. Serial No. 38,340. (No model.)

*To all whom it may concern:*

Be it known that I, DAVID B. BAKER, a citizen of the United States, residing at Tacoma, in the county of Pierce and State of Washington, have invented certain new and useful Improvements in Wood Split Pulleys; and I do hereby declare the following to be a full, clear, and exact description of the invention, such as will enable others skilled in the art to which it appertains to make and use the same.

My invention relates to improvements in pulleys, and particularly to that class of pulleys known as "wood split pulleys," which are made in sections, so as to be easily placed upon and taken from shafting.

It consists in certain novel constructions, combinations, and arrangements of parts, as will be hereinafter fully described, and specifically pointed out in the claims.

In the accompanying drawings, Figure 1 represents a side elevation of a wood split pulley, the sections of which have been slightly separated. Fig. 2 is a vertical transverse section through the same. Fig. 3 is a horizontal transverse section through the pulley upon a line with the shafting. Fig. 4 is a vertical longitudinal section through a portion of the pulley, showing the manner in which the webs and beams are secured together. Fig. 5 is a sectional view through a portion of the pulley upon the line $a$ $b$, Fig. 1.

1 1 in the drawings represent a section of a pulley made up of beams 2 2, segmental webs 3 3, and other peripheral segments 4 4, which are secured thereto. The present invention is designed to supply wood split pulleys of an exceedingly simple construction and yet ones that will be thoroughly strengthened and braced in all directions and which may be made to grip the shaft so as to be firmly fixed thereto. In making up such a pulley I preferably form the central portion of the pulley of two beams, one beam forming the basis of each of the pulley-sections 1 1. These beams 2 2 are preferably formed with facing concaved seats 5 5, which are adapted to fit about the shaft, as 6. To the ends of the beams 2 2 are bolted the segmental webs 3 3, which form the central portions of the peripheries of the pulley. The ends of the webs 3 3 are seated against the ends of the beams 2, and bolts, as 7 7, are passed through the said webs and the ends of the beams to securely fasten them together. The heads of the bolts 7 and the nuts thereof are seated in recesses formed in the webs 3 and the beams 2. To the opposite faces of the webs 3 3 are secured a series of segmental pieces 4 4 by any suitable means, the said pieces 4 4 being made of any desired thickness and arranged in any suitable number upon each side of the web to give the pulley the thickness or width desired. These segmental pieces 4 may be secured together and to the webs 3 by means of bolts or other attaching devices. The inner faces of the beams 2 2 are provided with a number of elongated recesses, as 8 8, which are adapted to receive the gripping plates or bars 9 9.

The bars 9 are provided at their central portions with concaved recesses adapted to fit upon the shaft 6. Bolts, as 10 10, are passed through the beams 2 and the ends of the gripping-bars 9 and are also passed through the ends of brace-bars 11 11, placed on the outer faces of the beams 2. Engaging the said bolts 10 10 and arranged upon each side of the ends of the gripping-bars are nuts 12 12, adapted to operate against the ends of the said gripping-bars 9 and force them in contact with the shaft 6. Other nuts 13 13 upon the ends of the bolts 10 clamp the beams and bars 11 together. The recesses 8 8 in the opposing faces of the beams 2 are arranged so that the bars 9 9 of one pulley-section will not be opposite the bars 9 of the other pulley-section. The said bars are thus capable of passing by each other as far as the shaft will permit when they are gripped in position upon each side of the same. By this arrangement of the bars 9 9 they can be forced very tightly against the shaft and can be so drawn toward each other by the nuts 12 12 as to be slightly sprung at their centers and exert somewhat of a spring-pressure against the shaft 6. This will operate to a great extent to prevent the loosening of the said bars and the nuts holding the same and the consequent loosening of the pulley upon the shaft. A pulley thus constructed will be found to be thoroughly braced in all directions, the web-sections 3 3 contributing a great deal to the strength of the structure, and the bolting of the beams together in the manner described will further serve to strengthen the pulley. The webs 3 preferably extend inwardly to a greater degree than the segments 4 4, forming the remainder of the periphery of the pulley.

The arrangement of the gripping-bars will make it possible also to secure the pulley to the shaft with any desired degree of fixedness. The pulley can be easily taken apart for placing it upon a shaft or removing it therefrom, it being merely necessary to operate the nuts upon the bolts 10 10. In a pulley of ordinary size I preferably employ two sets or pairs of gripping-bars, one pair for each section; but of course I do not limit myself to this number, as a greater or less number of bars may be employed, according to the size of the pulley, without departing in the least from the spirit of the invention. Gripping-bars may also be used on either side of the beams, if desired, as well as located in the recesses formed in the beams.

Having now described my invention, what I claim as new, and desire to secure by Letters Patent, is—

1. A split pulley comprising sections formed of beams, segmental webs secured to the beams, bolts passing through the webs and through the ends of the beams for holding them together, the said bolts being arranged on chords of the pulley, peripheral sections escured to the said webs, and means for binding the beams to a shaft, substantially as described.

2. A split pulley comprising beams forming the bases of pulley-sections, said beams having recesses formed within them, gripping-bars located within the said recesses, bolts passed through the gripping-bars, the heads of the said bolts engaging the gripping-bars directly for drawing them toward the shaft, brace-bars also slipped upon said bolts outside the beams and nuts outside the brace-bars for drawing the pulley-sections together over the gripping-bars, substantially as described.

3. A split pulley comprising sections formed of beams and segmental pieces secured together, gripping-bars mounted between the beams, the said bars of opposite sections being arranged out of alinement with each other, so that they may pass each other to some extent, bolts passing through the beams and the ends of the gripping-bars, and nuts for securing the beams together, and nuts for engaging the ends of the gripping-bars, whereby they may be forced against the shaft to which the pulley is to be attached, substantially as described.

4. A split pulley comprising beams adapted to be bolted together, peripheral sections secured to the said beams, gripping-bars arranged out of alinement so as to pass each other somewhat, for holding the sections of the pulley together and adapted to engage the shaft to which the pulley is to be attached, and bolts for securing the beams and gripping-bars in position, substantially as described.

In testimony whereof I hereunto affix my signature in presence of two witnesses.

DAVID B. BAKER.

Witnesses:
FRANK J. MILLER,
LAURENCE SLEDGE.